United States Patent [19]

Parker

[11] Patent Number: 4,963,188

[45] Date of Patent: Oct. 16, 1990

[54] WATER-BASED INK COMPOSITION

[75] Inventor: David W. Parker, Holland, Pa.

[73] Assignee: Union Camp Corporation, Wayne, N.J.

[21] Appl. No.: 252,629

[22] Filed: Sep. 30, 1988

[51] Int. Cl.$^5$ .............................................. C09D 11/02
[52] U.S. Cl. ...................................... 106/20; 106/30; 106/241; 260/101
[58] Field of Search .................. 106/20, 30, 241; 260/101

[56] References Cited

U.S. PATENT DOCUMENTS

| | | | |
|---|---|---|---|
| 2,072,818 | 3/1937 | Humphrey | 527/604 |
| 2,244,103 | 6/1941 | Erickson et al. | 106/30 |
| 2,300,881 | 11/1942 | Erickson et al. | 106/30 |
| 2,323,710 | 7/1943 | Erickson et al. | 106/30 |
| 2,336,983 | 12/1943 | Erickson et al. | 106/30 |
| 2,437,908 | 3/1948 | Chiappe et al. | 106/30 |
| 2,461,918 | 2/1949 | Petke | 106/30 |
| 2,540,776 | 2/1951 | Cadwell | 106/30 |
| 2,653,142 | 9/1953 | Cody et al. | 106/30 |
| 2,720,461 | 10/1955 | Voet | 106/30 |
| 2,733,155 | 1/1956 | Williams et al. | 106/30 |
| 2,818,412 | 12/1957 | Eckhardt et al. | 106/30 |
| 3,582,509 | 6/1971 | Staniak et al. | 527/601 |
| 3,692,720 | 9/1972 | Sloan | 527/600 |
| 3,950,290 | 4/1976 | Drury, Jr. et al. | 106/30 |
| 3,951,892 | 4/1976 | Drury, Jr. et al. | 106/30 |
| 4,056,498 | 11/1977 | Laurito | 525/285 |
| 4,189,410 | 2/1980 | Laurito | 524/272 |
| 4,234,466 | 11/1980 | Takahashi et al. | 525/481 |
| 4,433,100 | 2/1984 | Laurito | 525/54.42 |
| 4,574,057 | 3/1986 | Kaza et al. | 106/30 |

*Primary Examiner*—William R. Dixon, Jr.
*Assistant Examiner*—Helene Klemanski
*Attorney, Agent, or Firm*—Edward J. Sites

[57] ABSTRACT

Novel water-based ink compositions, suitable as flexographic and gravure inks, are disclosed which incorporate high molecular weight resin acid-maleic anhydride polymers. The ink compositions of this invention comprise a coloring agent and a resin vehicle which comprises an aqueous solution of the reaction product of rosin and maleic anhydride in the presence of a free radical polymerization initiator.

21 Claims, No Drawings

WATER-BASED INK COMPOSITION

BACKGROUND OF THE INVENTION

This invention relates to ink compositions. More particularly, it relates to water-based ink compositions whose resin component comprises high molecular weight resin acid-maleic anhydride copolymer.

A significant contributor to the print properties of inks is the resin they contain. The resin can influence the gloss, opacity, rub resistance and holdout, among other properties, of the print. Many attempts have been made to develop resins which would impart to inks, including water-based inks, superior levels of gloss, holdout, etc.

In the area of rosin-based resins, it is well-known to modify rosin to improve the print properties of ink formulated therefrom by reacting the rosin at high temperatures with maleic anhydride. The high temperatures promote Diels-Alder and Ene reactions between maleic anhydride and certain resin acids present in the rosin. The reaction products ("rosin maleic anhydride adducts") result from the adduction of one maleic anhydride to one reactable rosin component and are thus of low molecular weight. While such conventional water-soluble-maleic anhydride-modified rosin resins and derivatives thereof are commercially utilized in ink compositions, they often give brittle films that lack scuff resistance and good leveling and tend to dry more slowly than desired.

If instead, a high molecular weight polymer could be formed from components of commercially available rosin, and if this polymer had a higher melting point and better film-toughness than rosin or rosin maleic anhydride adduct, then inks having improved rub resistance, better leveling, faster-drying properties, and thermal and UV stability could be prepared using such polymer. High molecular weight polymers of resin acids present in rosin, and esters thereof, have now been found. They are disclosed and claimed in copending patent application U.S. Ser. No. 191,935, filed on May 9, 1988, the disclosure of which is herein incorporated by reference.

SUMMARY OF THE INVENTION

This invention is directed to aqueous ink compositions incorporating such high molecular weight resin acid-containing polymers. These water-based inks are useful in flexographic, gravure, intaglio, ink-jet, and other forms of printing and in writing implements, especially ball-point pens. More specifically, the ink compositions of this invention comprise a coloring agent and a resin vehicle which comprises an aqueous solution of a polymer which comprises the product of copolymerization of resin acids present in rosin or esters thereof and maleic anhydride, said polymer having a peak molecular weight of at least about 1500. These ink compositions exhibit excellent color development, film-forming properties and gloss upon being applied to paper.

DETAILED DESCRIPTION OF THE INVENTION

The resin vehicle used in the ink compositions of this invention comprises an aqueous solution of the reaction product of rosin and maleic anhydride in the presence of a free radical initiator. The material of commerce known as rosin is a natural substance usually obtained from pine trees. It largely comprises structurally similar C-20 monocarboxylic acids which are known as, and are referred to hereinafter as, resin acids. Rosin also frequently contains fatty acids, decarboxylated resin acids, and resin acid dimers and anhydrides. The composition of rosin will vary depending on the species of tree from which it is isolated, the location and season of the isolation, and the manner of isolation. For instance, gum rosin is the sap collected when a pine trunk is wounded, and tall oil rosin is a byproduct of the paper making process. Examples of the rosins which may be utilized to prepare the polymers of this invention include tall oil rosin, distilled tall oil rosin, gum rosin, and wood rosin. A more complete description of the various components of rosin can be found in a report written by M. S. Bhatnager in *Paint India*, Feb. 1982, pp. 4–19.

The structures of three of the resin acids typically present in rosin, referred to hereinafter as the "abietics", are as follows:

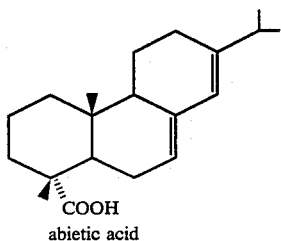
abietic acid

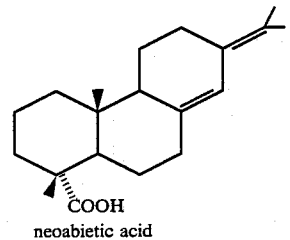
neoabietic acid

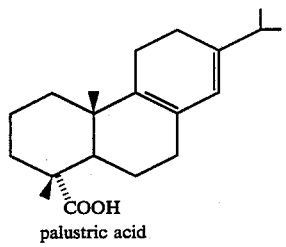
palustric acid

To prepare the reaction product for use in the instant ink compositions, rosin, maleic anhydride, and an effective amount of at least one free-radical polymerization initiator are combined, preferably in the presence of a suitable solvent. After mild heating for an appropriate length of time, the reaction mixture consists of resin acid-maleic anhydride copolymer, unreacted rosin, and the adduct of rosin and maleic anhydride. Gas chromatographic analysis of the residual unreacted rosin in the reaction mixture indicates that "abietics", the resin acids identified above, are no longer present. Although not intending to be bound by this theory, it is the inventor's belief that abietic acid and neobietic acid undergo copolymerization with maleic anhydride, while the palustric acid reacts with maleic anhydride primarily to produce a Diels-Alder adduct.

The copolymeric resin is believed to be a 1:1 resin acid-maleic anhydride polymer and to have the form of a linear polymer wherein the maleic anhydride and resin acid units repeat in an alternating arrangement, part of which can be represented as follows:

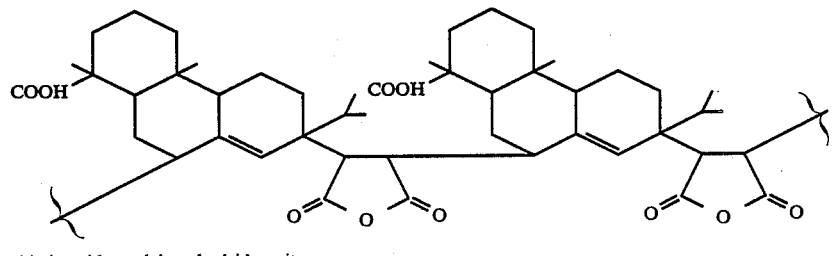

abietic acid - maleic anhydride units

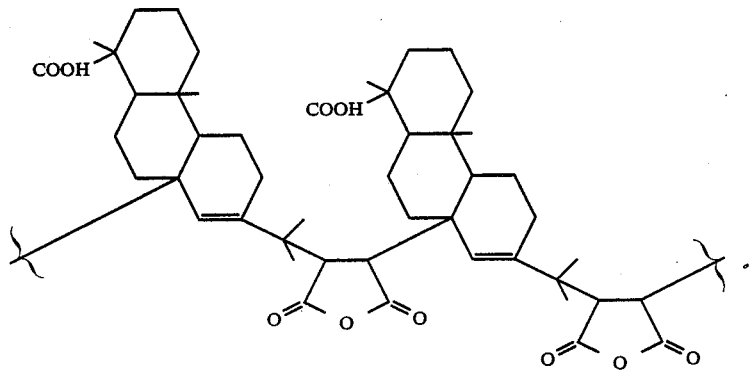

neoabietic acid - maleic anhydride units

In preparing the reaction product used in this invention, the rosin may be used without prior modification. In other words, the resin acid is not stabilized, i.e., aromatized or hydrogenated, to control or prevent its reaction in the polymerization process, and it is not activated, i.e., esterified with a reactive unsaturated alcohol, or adducted prior to copolymerization. In fact, since the olefinic bonds present in the abietics are believed crucial to the success of the copolymerization reaction, prior stabilization of rosin through aromatization or hydrogenation is judged detrimental. One can utilize modified rosin if the modification does not disrupt the olefinic composition of the rosin. For example, simple (i.e., unreactive) esters and/or anhydrides of rosin carboxylate can be partially or completely substituted for natural rosin in the practice of this invention.

In general, the ratio of monomers utilized is not critical; however, it is convenient to employ a molar ratio of maleic anhydride to abietics of between 1.0 and 2.0, preferably between 1.0 and 1.5.

The resin acid-maleic anhydride polymers which form a portion of the resin vehicle can further comprise one or more additional monomers capable of polymerizing with maleic anhydride. Such additional monomers preferably comprise not more than 25 mole % of the polymer, and the resulting polymers preferably comprise at least about 25 mole % resin acid(s) and at least about 25 mole % maleic anhydride. Monomers capable of polymerizing with maleic anhydride are well known in the art and include, for example, styrene. Terpenes capable of polymerizing with maleic anhydride such as beta-pinene, beta-phellandrene and isoterpinolene, may also be used.

The resin acid-maleic anhydride polymers utilized in this invention are prepared by contacting maleic anhydride and rosin in the presence of an effective amount of one or more free-radical initiators. The preferred initiator is 2,2'-azobis(2-methylpropanenitrile) (AIBN). Other suitable initiators include peroxides, e.g. di-t-butyl peroxide and dicumyl peroxide. Ordinarily, initiator concentration will be within the range of from about 0.01 to 2 weight percent, preferably about 0.1 to 1 weight percent, based on the total weight of rosin and maleic anhydride.

The temperature employed can be varied over a wide range. The most suitable temperature is largely fixed by the choice of the free-radical initiator. A reaction temperature such that the half-life of the initiator is approximately five hours is convenient, but higher or lower temperatures are acceptable. Ordinarily, the temperature will be between 40° C. and 130° C., and more preferably between 60° to 80° C.

It is preferable to conduct the reaction in a solvent. A suitable solvent should dissolve the starting materials at the reaction temperature employed and also dissolve the product mixture. Preferred solvents include aromatic hydrocarbons such as toluene, aliphatic or aromatic esters such as ethyl acetate, and aliphatic ethers such as tetrahydrofuran.

As previously indicated, the reaction product obtained ordinarily consists of the copolymer formed between selected resin acids and maleic anhydride, unreacted resin acids and other rosin components, and adducts formed between maleic anhydride and selected resin acids. The properties of this reaction mixture depend upon the composition of the mixture, which in turn depends upon the source of the rosin and the reaction conditions employed. The reaction product preferably comprises about 10-60% by weight of the resin acid-maleic anhydride polymer. At higher amounts, the resin vehicle can be too viscous for use in an ink composition and, at lower amounts, the vehicle can lack the desired film-forming properties. More preferably, the reaction product comprises about 20-50 weight % of the polymer.

The polymers contained in the reaction product generally have a peak molecular weight of at least about 1500, preferably in the range of at least about 3,000 to 8,000, as measured by gel permeation chromatography with retention times referenced to polystyrene of known molecular weights, using a refractive index detector.

Prior to being utilized in preparing the ink compositions of this invention, the reaction product may be modified. For example, it has been found advantageous to esterify the reaction product (i.e., the resin acid-maleic anhydride copolymer and adducts therein) to improve the solubility and film properties of the reaction product. Generally, the reaction product may be esterified by heating it together with an alcohol, in a molar ratio of anhydride units in the resin to alcohol of about 0.5 to 5. The extent and duration of heating can vary, but generally heating to about 130° C. for a period of about 4-12 hours will suffice. Preferred alcohols include but are not limited to primary aliphatic alcohols such as ethanol, n-propanol, and n-butanol and ether alcohols such as diethylene glycol monomethyl ether and ethylene glycol n-butyl ether, and amino-alcohols such as dimethylaminoethanol.

Another useful modification of the reaction product occurs upon treatment with amines. This modification is believed to proceed by reaction of the amine with anhydride functionality present in the resin to produce neighboring acid and amide groups. The reaction occurs under mild conditions, with temperatures in the range of 25° C. to 100° C. typically being employed. Preferred amines include primary amines such as butylamine, secondary amines such as morpholine, and amino alcohols such as monoethanolamine.

The reaction product is dissolved in water to form the resin vehicle which is used to prepare the inks of this invention. It is necessary to incorporate into the aqueous solution of the reaction product one or more bases such as ammonia, water-soluble amines such as morpholine, triethanolamine and monoethanolamine, or alkali and alkaline earth hydroxides such as potassium hydroxide and sodium hydroxide. The bases form salts with the components of the reaction product, allowing the solubility of those components in water. Generally, sufficient quantities of the base(s) are incorporated into the solution so that the pH of the solution is in the range of 8.0 to 10.0, preferably 8.5 to 9.0.

Other components which may be incorporated into the resin vehicle are other water-soluble and/or water-dispersible thickeners, wax emulsions, biocides, corrosion inhibitors, antifoam agents, surfactants, and up to about 10% of an alcohol such as isopropanol.

There is no limitation on the nature of the coloring agents which may be used in the inks of this invention. For example, suitable coloring agents include, but are not limited to, organic dyes and pigments, e.g., of the azo and phthalocyanine types, inorganic pigments such as titanium dioxide and iron blue, and carbon black, e.g., of the lamp black type.

The resin vehicle is generally combined with additional water and with the desired coloring agent and milled to disperse the coloring agent to the greatest extent possible. The ratio of resin vehicle to pigment is important to achieve the proper degree of dispersement; however, the optimal amount cannot be stated since it will vary with pigment type and with resin type.

The ink compositions of this invention will be further described by the following examples which are not intended to limit the scope of this invention. The acrylic based inks used for comparison in these examples are made with Joncryl 678 acrylic-styrene resin, available from S. C. Johnson Company.

EXAMPLE 1

(a) A rosin/maleic anhydride reaction product was prepared as follows: A flask was charged with 1,300 g of Unitol NCY rosin, available from Union Camp Corporation, 350 g of maleic anhydride, 1,200 g of toluene and 19.5 g of 2,2′-azobisisobutyronitrile (AIBN). This mixture was heated and stirred under a nitrogen blanket at 75° C. for 27 hours. The toluene and unreacted maleic anhydride were then recovered by distillation. The resin contained 30% resin acids-maleic anhydride copolymer with the remaining solid comprising rosin, rosin dimer and rosin maleic anhydride adduct. The copolymer had a peak molecular weight of 3800 as measured by gel permeation chromatography using polystyrenes of known molecular weight as reference.

(b) A flask was charged with 503 g of the above reaction product and 400 g of 1-propanol. This was heated at 100° C. for 16 hours, and then the unreacted propanol was removed by distillation.

(c) The n-propyl ester of step (b) was used to prepare the following Resin Vehicle:
50 parts of the n-propyl ester
4 parts of aqueous (28%) ammonia
2 parts of monoethanolamine
38.8 parts of water
0.2 parts antifoam agent (SAG 471, Union Carbide)
5 parts of isopropanol (d) To prepare an ink composition, the following components were ground in a Quicky-Mill for 30 minutes:
12 parts Resin Vehicle with 50% non-volatiles
12 parts Elftex 8 Carbon Black from Cabot Corp.
24 parts water The resulting mixture was then well-mixed with:
24 parts Resin Vehicle with 50% non-volatiles
27.8 parts water
0.2 parts antifoam agent (SAG 471, Union Carbide)

The resulting ink had a pH of 8.5 and a viscosity of 10 seconds on a #2 Shell cup. This ink was tested against a conventional acrylic-styrene resin-based ink system. The experimental ink was found to have superior hold-out, color development and gloss on untreated newsink stock, relative to the acrylic ink. The experimental ink also laid better on the paper and showed less bronzing than did the acrylic based ink.

EXAMPLE 2

(a) The n-propyl ester as prepared in Example 1(b) was used in preparing the following Resin Varnish:
40 parts n-propyl ester
4 parts aqueous ammonia (29%)
4 parts monoethanolamine
0.1 parts antifoam agent (SAG 471, Union Carbide
5 parts isopropanol
41.9 parts water
5 parts water and amine to adjust the varnish pH to 8.5

(b) To prepare an ink composition, the following components were ground in a Redi-Mixer for 20 minutes:
12 parts organic pigment
25 parts Resin Varnish 25 parts water
0.1 parts antifoam agent (e.g., SAG 471, Union Carbide)
This mixture was then thoroughly mixed with:
25 parts Resin Varnish
10.9 parts water The resulting ink composition had a viscosity of 21 seconds on a #2 Zahn cup. The experimental ink was tested against a conventional acrylic-styrene resin-based ink system on both coated and uncoated paper and on foil. The experimental ink displayed relatively better gloss, transparency on foil and better lay on paper.

EXAMPLE 3

(a) A reaction product of rosin and maleic anhydride was prepared as follows: A five liter kettle was charged with 1,200 g Unitol NCY rosin and 1,150 g toluene, and the mixture was heated to 70° C. under a nitrogen blanket until it appeared homogeneous. Then 256 g of maleic anhydride was added and, when this dissolved, 12 g of AIBN was added. The reaction solution was stirred and maintained at 70° C. for 16.5 hours, and then 6 g additional AIBN was added. After 8 more hours at 70° C., the toluene and unreacted maleic anhydride were removed by distillation. The product contained 32% copolymer, with the remaining 68% of the product comprising rosin, rosin dimer and rosin maleic anhydride adduct(s). The copolymer had a peak molecular weight of 4,300 relative to polystyrene of known molecular weight.

(b) A Resin Varnish was prepared by blending the following ingredients to homogeneity:
40 parts reaction product of (a)
4 parts aqueous ammonia (28%)
4 parts monoethanolamine
0.1 parts antifoam agent (SAG 471, Union Carbide)
5 parts isopropanol Then, 5 parts total of water and ammonia were added to bring the pH of the Resin Varnish to 8.5.

(c) An ink composition was prepared by mixing the following in a Quicky-Mill for 30 minutes:
12 parts organic pigment
25 parts Resin Varnish
25 parts water
2 parts polyethylene wax
0.1 antifoam agent (SAG 471, Union Carbide)

The following ingredients were then thoroughly mixed into the mixture:
25 parts Resin Varnish
10.9 parts water When the resulting ink was drawn down on paper, it showed excellent color development and laid better on the paper than did a standard acrylic based ink.

What is claimed is:

1. An ink composition comprising a coloring agent and a resin vehicle which comprises an aqueous solution of a resin acid-maleic anhydride polymer, said polymer being produced by the copolymerization of maleic anhydride reactive resin acids present in rosin, or esters thereof, and maleic anhydride, in the presence of a free-radical initiator, said polymer having a peak molecular weight of at least about 1500 as measured by gel permeation chromatography with retention times references to polystyrene of known molecular weights.

2. The ink composition of claim 1 where said resin acid-maleic anhydride polymer has a peak molecular weight in the range of about 3000 to 8000.

3. The ink composition of claim 1 where said resin acid-maleic anhydride polymer further comprises one or more additional monomers capable of polymerizing with maleic anhydride.

4. The ink composition of claim 3 where said one or more additional monomers comprise up to about 25 mole % of said polymer.

5. The ink composition of claim 3 in which said one or more additional monomers are selected from styrene, beta-pinene, beta-phellandrene and isoterpinolene.

6. The ink composition of claim 1 in which said polymer is esterified with an alcohol.

7. The ink composition of claim 6 in which said polymer is esterified with a compound selected from ethanol, n-propanol, n-butanol, diethylene glycol monomethyl ether, ethylene glycol n-butyl ether and dimethylaminoethanol.

8. The ink composition according to claim 1 in which the polymer is reacted with an amine compound.

9. The ink composition according to claim 8 in which the polymer is reacted with a primary or secondary amine.

10. The ink composition according to claim 8 in which the polymer is reacted with a compound selected from butylamine, morpholine, and monoethanolamine.

11. The ink composition of claim 1 in which said resin vehicle further comprises an amount of base sufficient to bring the pH of said vehicle within the range of about 8.0 to 10.0.

12. The ink composition of claim 11 in which said resin vehicle further comprises an amount of base sufficient to bring the pH of said vehicle within the range of about 8.5 to 9.0.

13. The ink composition of claim 11 in which said base is selected from the group consisting of ammonia, water-soluble amines, and alkali metal hydroxides.

14. An ink composition comprising a coloring agent and a resin vehicle which comprises an aqueous solution of the reaction product of rosin and maleic anhydride prepared in the presence of a free radical polymerization initiator.

15. The ink composition of claim 1 in which said free radical polymerization initiator is 2,2,'-azobis(2-methylpropanenitrile) and is present in an amount of about 0.1 to 2 weight percent, based on total weight of rosin and maleic anhydride.

16. The ink composition of claim 14 in which said reaction product comprises resin acid-maleic anhydride polymer having a peak molecular weight in the range of about 3000 to 8000.

17. The ink composition of claim 14 in which about 10 to 60 weight % of said reaction product comprises said polymer.

18. The ink composition of claim 17 in which about 20 to 45 weight % of said reaction product comprises said polymer.

19. The ink composition of claim 14 in which said reaction product is modified by reaction with an alcohol or amine.

20. The ink composition of claim 14 in which said resin vehicle further comprises an amount of base sufficient to bring the pH of said vehicle within the range of about 8.0 to 10.0.

21. The ink composition of claim 14 in which said base is selected from ammonia, water-soluble amines and alkali metal hydroxides.

* * * * *